March 27, 1962 G. SLAYTER ETAL 3,026,563
APPARATUS FOR PROCESSING HEAT-SOFTENABLE MATERIALS
Filed April 18, 1956 3 Sheets-Sheet 2

INVENTORS
GAMES SLAYTER
HENRY J. SNOW
ROBERT G. RUSSELL
DALE KLEIST
BY
ATTYS.

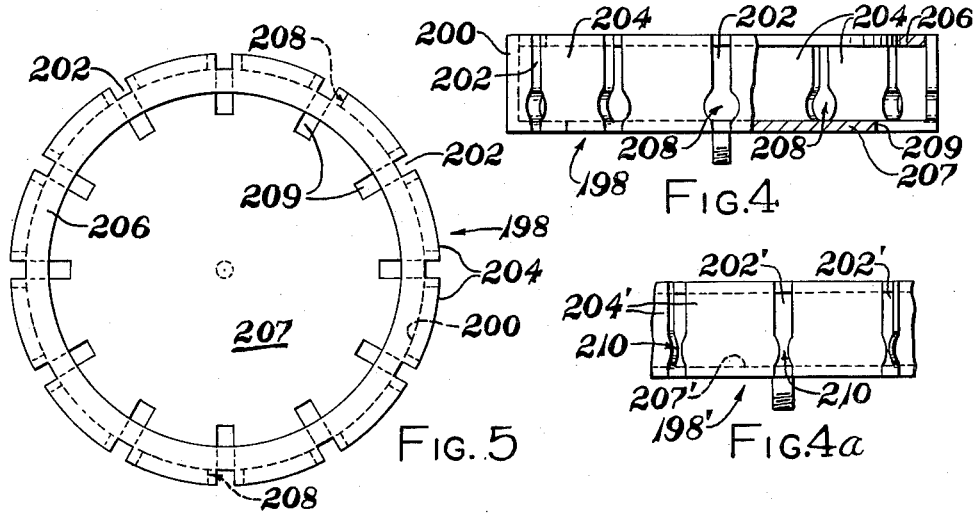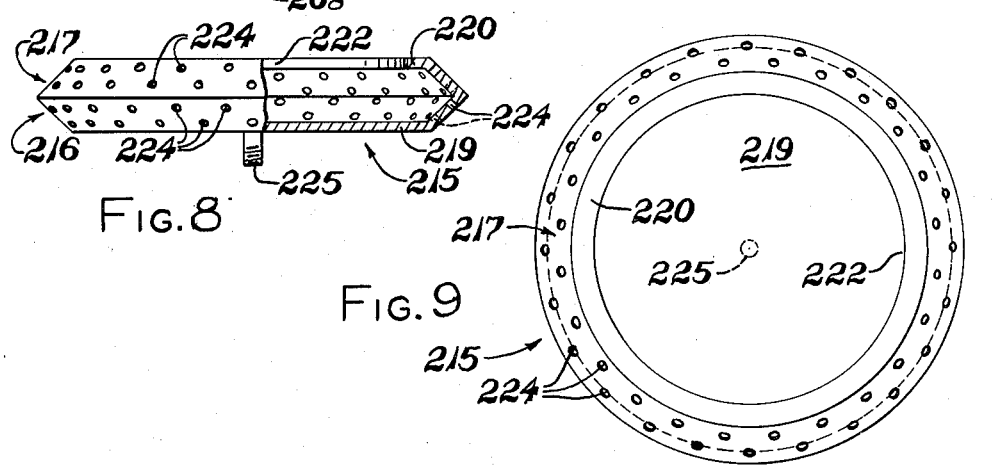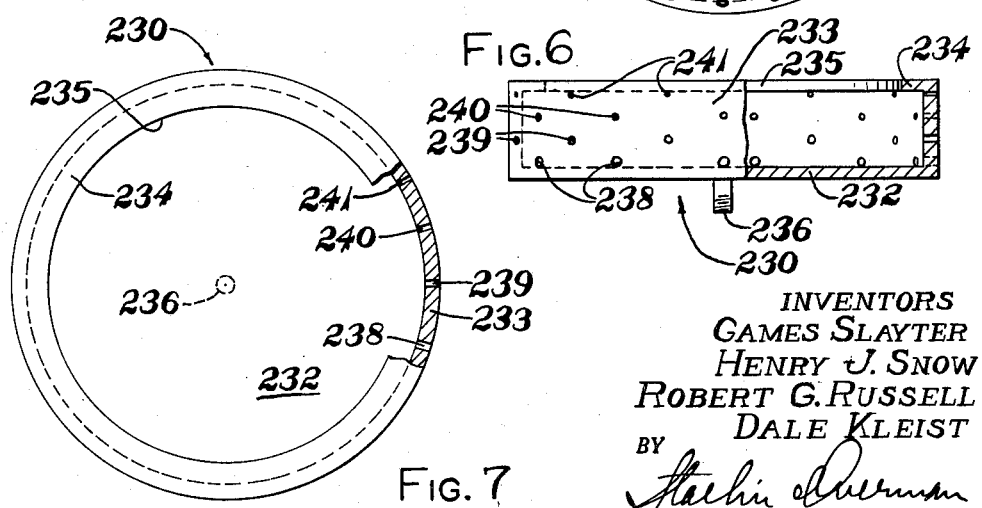

United States Patent Office 3,026,563
Patented Mar. 27, 1962

3,026,563
APPARATUS FOR PROCESSING HEAT-
SOFTENABLE MATERIALS
Games Slayter and Henry J. Snow, Newark, Robert G. Russell, Granville, and Dale Kleist, St. Louisville, Ohio, assignors to Owens-Corning Fiberglas Corporation, a corporation of Delaware
Filed Apr. 18, 1956, Ser. No. 578,926
3 Claims. (Cl. 18—2.6)

This invention relates to apparatus for processing heat-softenable materials in the production of fibers or discrete bodies from heat-softenable materials and pertains more especially to forming fibers, filaments, films, flakes or particulate forms.

It has been commercial practice to form molten glass, slag, or fusible rock into fibers by subjecting streams of the molten materials to high velocity gaseous blasts which are effective to draw out or attenuate the streams to fibers or discrete bodies. Blasts at temperatures below the fusing point of the materials such as steam and air blasts have been used for the purpose, and finer fibers or discrete bodies have been formed by engaging the molten materials by high velocity gaseous blasts wherein the gases are at temperatures above the fusing temperatures of the materials.

Developments have been made and used wherein a stream of glass or other heat-softened attenuable mineral material is delivered into engagement with a rotating spinner or rotor and is acted upon by centrifugal forces through rotation of the spinner or rotor to project the heat-softened material outwardly of the axis of rotation whereby the material is formed into elongated bodies. Where it is desired to form fine fibers from the bodies, a gaseous blast is employed to draw out or attenuate the bodies to fibers.

In arrangements of this character, a glass stream or streams of molten material are introduced into the hollow spinner or rotor and engage a surface within the spinner or rotor and is moved outwardly by centrifugal forces into engagement with a perforated wall of the spinner. The effective distribution of the material within the rotor has presented difficulties in order to secure a uniform amount of molten material at the peripheral wall of the rotor in order to secure satisfactory formation of bodies projected from the spinner.

The present invention embraces means for distributing softened material by rotating means in order to obtain desired placement of the material relative to the axis of rotation to produce discrete bodies of the material having substantially uniform characteristics.

Another object of the invention embraces structural arrangements for delivering molten mineral material generally outwardly of an axis to effect a uniform distribution at a zone or zones spaced from the axis at which the material may be formed by centrifugal forces into elongated bodies or filaments of predetermined cross-sectional configuration.

Another object of the invention resides in the provision of a rotatable component especially adapted for transferring molten material moving in a generally vertical path to a plurality of outwardly directed paths of traverse, the arrangement embodying means for subdividing or separating the outwardly moving material into discrete bodies for further processing.

Another object of the invention resides in the provision of rotatable means for distributing heat-softened mineral materials wherein the material is projected through apertures of predetermined configuration or shape for forming discrete bodies of the projected material.

Another object of the invention resides in the provision of means associated with a rotor arranged to receive one or more streams of heat-softened mineral material and transfer it in outwardly directed paths under the influence of centrifugal forces for obtaining desired circumferential distribution of the material.

Another object is the provision of means for distributing flowable material by centrifugal forces to a circular zone spaced from an axis of rotation whereby the distribution or collection of the material at the circular zone may be regulated and controlled.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 4 is an elevational view partly in section of a material distributing means;

FIGURE 4a is a fragmentary detail view showing a modification of the means shown in FIGURE 4;

FIGURE 5 is a plan view of the construction shown in FIGURE 4;

FIGURE 6 is an elevational view partly in section illustrating another form of material distributing means;

FIGURE 7 is a top plan view, partly in section, of the construction shown in FIGURE 6;

FIGURE 8 is an elevational view partly in section illustrating still another form of material distributing means, and FIGURE 9 is a top plan view of the construction shown in FIGURE 8.

Figure 1:
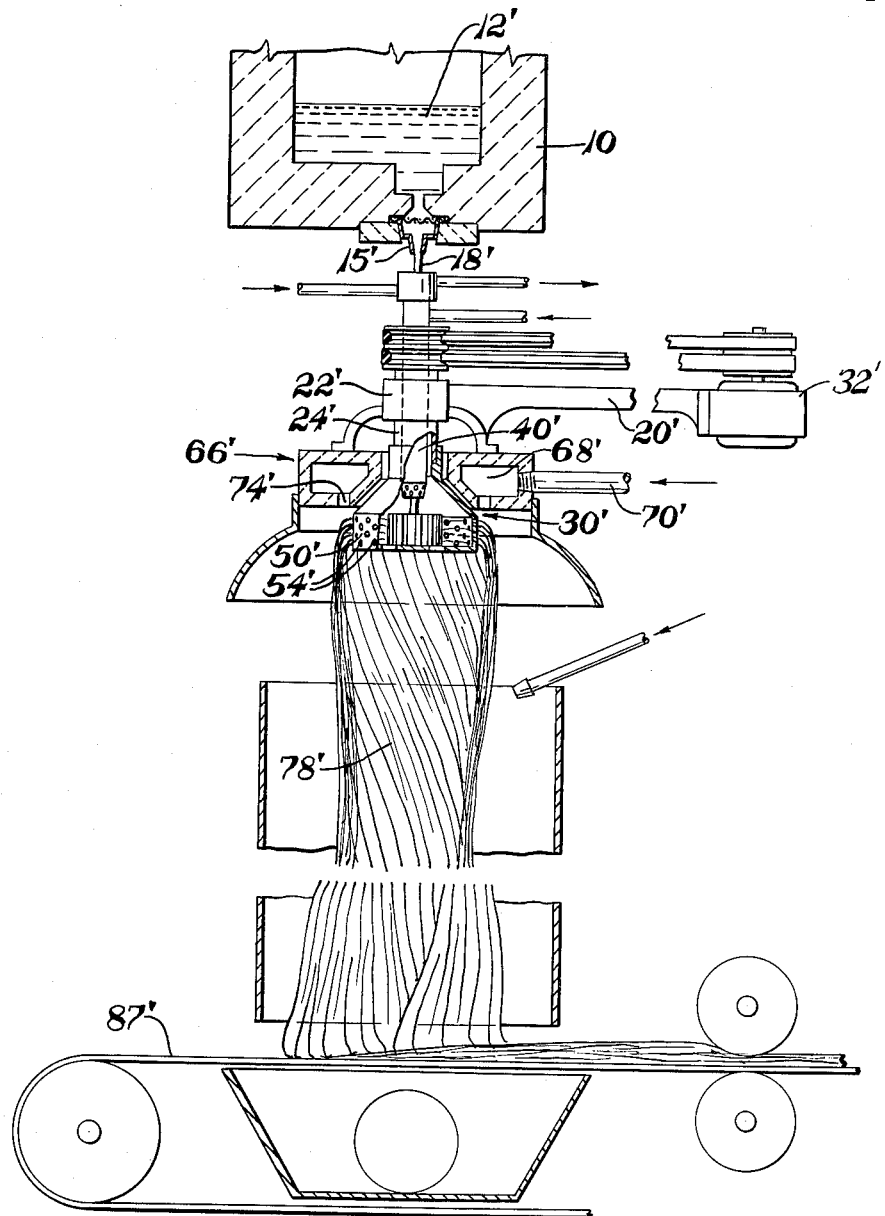
FIGURE 1 is a semidiagrammatic vertical sectional view of apparatus embodying the invention.
Figure 2:
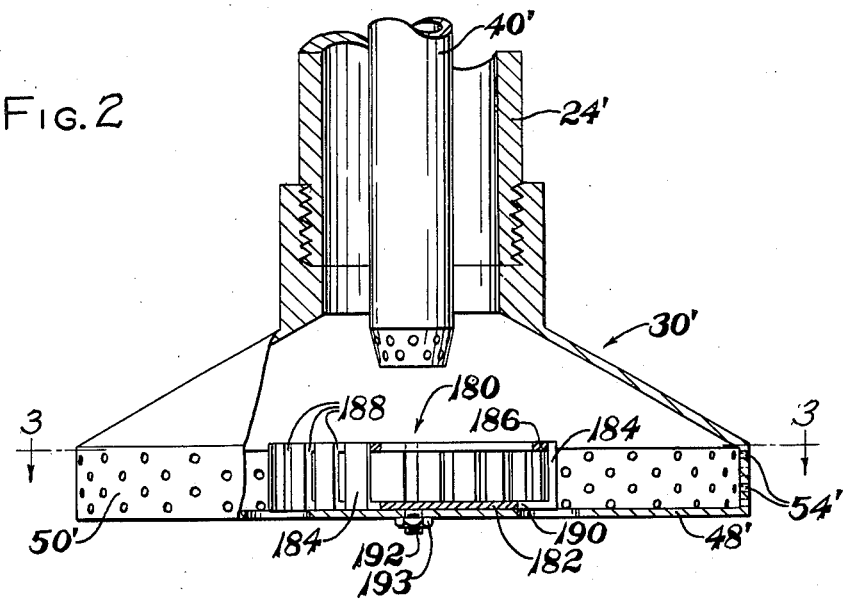
FIGURE 2 is a vertical sectional view illustrating in detail the form of rotor and material distributing element shown in FIGURE 1.
Figure 3:
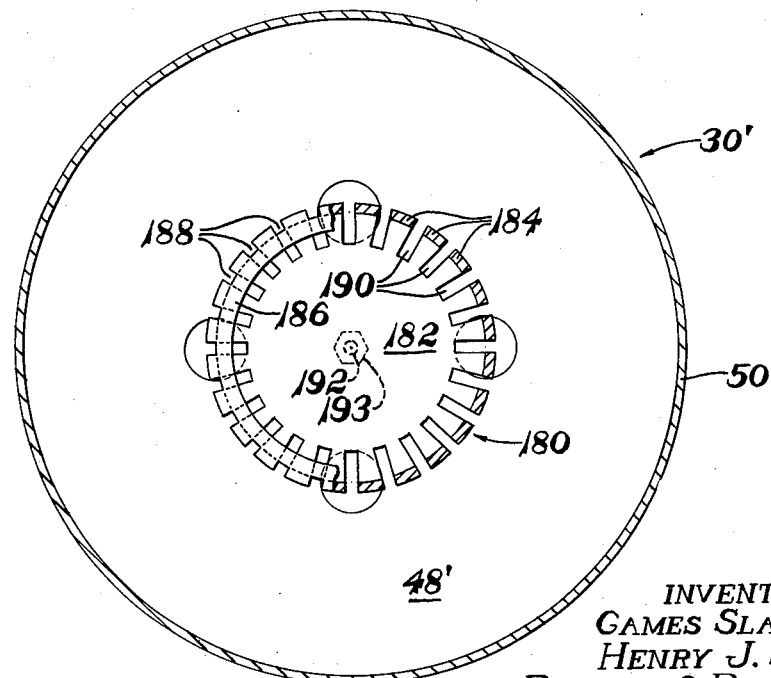
FIGURE 3 is a horizontal sectional view taken substantially on the line 3—3 of FIGURE 2.

FIGURES 1 through 3 illustrate a form of material distributing means of the invention for use with a rotor. With particular reference to FIGURE 1, there is illustrated a rotor construction rotated by a motor 32′ in conjunction with a blast burner arrangement. Molten material 12′ in a forehearth 10 is discharged through an orifice 15′ as a stream 18′ through a hollow shaft 24′, the latter being journalled in bearings carried by a hub portion 22′ of a frame 20′.

Mounted upon the shaft 24′ is a rotor 30′ provided with a peripheral wall 50′ having perforations 54′. The stream of material 18′ is delivered through the hollow shaft 24′ through the hollow interior of a burner tube 40′ to the interior of the rotor 30′.

Surrounding the rotor 30′ is a burner 66′ provided with an annular combustion chamber 68′ in which a combustible mixture is burned, the mixture being supplied through a pipe 70′.

The intensely hot burned gases from the chamber 68′ are delivered or projected through an annularly shaped restricted orifice 74′, the gases of the blast engaging discrete bodies or primary filaments of fiber-forming material projected through the orifices 54′. The high velocity gases attenuate the bodies or primary filaments into fine fibers 78′ which may be collected upon the upper flight 87′ of a conveyor.

As shown in FIGURES 1, 2 and 3 an arrangement is illustrated for distributing the molten glass or other heat-softened material to the peripheral zone defined by the circular wall 50′ of the rotor. Disposed within the rotor and preferably supported by the bottom wall 48′ is a circularly shaped, cup-like member 180 having a bottom wall 182 which is integrally joined with an upwardly extending circular wall formed with a plurality of circumferentially spaced slots 188 defined by portions 184 of the vertical wall, the bars or portions 184 being integrally joined together at their upper extremities by means of an annularly shaped portion or inwardly extending flange 186.

The peripheral region of the bottom wall 182 is slotted as at 190 forming continuations of the slots or spaces 188 formed in the side wall of the cup. The cup-shaped member 180 may be secured to the bottom wall 48' of the rotor by means of a tenon 192 formed on the member and a securing nut 193. The annular or ring shaped portion 186 integrally joining the upper extremities of the wall portions 184 securely retains the portions against distortion under the influence of centrifugal forces of rotation.

The member 180 rotates with the rotor 30' and the stream of glass or other heat-softened material delivered downwardly through the hollow interior of the burner tube 40' impinges upon the upper surface of the bottom wall 182 of the distributing member 180. The centrifugal forces set up by rotation of the member 180 influences the molten material on the bottom wall 182 to be thrown outwardly through the spaces or slots 188 and 190 and into contact or engagement with the peripheral zone defined by the rotor wall 50'. The bars or wall portions being substantially uniformly spaced throughout the peripheral zone of the cup-like member 180, results in the molten material within the distributing cup 180 being susbtantially uniformly delivered through the spaces 188 and 190 and dispersed over the interior surface of the rotor wall 50'.

The height of the cup arrangement and hence the length of the vertically arranged slots 188 is preferably of a dimension whereby the material moved through the slots 188 under the influence of centrifugal forces of rotation will be directed over substantially the entire area of the peripheral zone of the rotor defined by the wall 50' to maintain a film or quantity of the molten material over the perforated area of the rotor wall 50' whereby uniform bodies or primaries of the material will be formed of the material projected through the openings or orifices 54'.

Under certain operating conditions with glass or other molten material of particular viscosity there may be a tendency for a greater amount of the glass or molten material to move through the zones of the slots adjacent the bottom wall of the cup. FIGURES 4 and 5 illustrate a modified form of the construction shown in FIGURE 2 wherein certain zones of the slots are enlarged for the purpose of exercising better control over the distribution of glass or other molten material.

The material distributing member 198 has its vertical peripheral wall portion 200 formed with spaced slots 202, the upper ends of the bars or portions 204 defining the slots being integrally joined by an inwardly extending flange 206. The zones of the slots adjacent the bottom wall 207 of the cup-like member may be enlarged as shown at 208 to facilitate the distribution of the increased amount of material adjacent the lower end zones of the slots 202.

The peripheral portion of the bottom wall 207 is also provided with slots 209 which register with the slots 202 in the side wall of the member 198. The member 198 shown in FIGURES 4 and 5 may be advantageously used with a rotor wherein the perforated peripheral wall is is angularly arranged with respect to the axis of the rotor.

Under certain operating conditions, it may be desirable to restrict the flow of material through certain zones of the slots in a cup-liked distributing member. FIGURE 4a illustrates a modification of the cup construction or distributing member shown in FIGURE 4. The cup member 198' is provided with slots 202' defined by vertically extending portions 204' of the peripheral wall of the cup. In this form, the lower zones of the slots 202' viz the zones adjacent the bottom wall 207' may be fashioned with restricted zones 210 for controlling or limiting to a certain degree the flow of material outwardly through these portions of the slots in the wall of the cup-like material distributing member.

It is to be understood that the enlarged zones of the slots shown in FIGURE 4 or the restricted zones of the slots shown in FIGURE 4a may be disposed in any region of the side wall of the cup member dependent upon the region in which it is desired to secure greater delivery of the material or to restrict the flow of material dependent upon the viscosity of the material to be distributed by the member and the structural characteristics of the rotor with which the member may be used.

Another form of cup-like distributing means 230 is illustrated in FIGURES 6 and 7. The distributing member 230 is inclusive of a bottom wall 232, a vertically disposed circular peripheral wall 233 formed at its upper zone with an inwardly extending flange 234, the latter defining an opening 235 through which the stream of material enters into the hollow interior of the cup-like member. The bottom wall of the cup-like member is formed with a threaded tenon 236 providing means for securing the member to a rotor construction.

The circular peripheral wall 233 of the cup-like member is formed with rows of orifices or outlets, there being four rows illustrated in FIGURE 6 and designated respectively 238, 239, 240 and 241. It is to be understood that any number of rows or orifices may be formed in the circular peripheral wall 233 dependent upon the amount of glass or other molten material to be distributed by the member 230. As particularly shown in FIGURE 6, the orifices of the rows progressively increase in diameter from the top to the bottom of the member 230, the orifices of row 241 being the smallest and the orifices of 238 being the largest.

Such an arrangement may be advantageous where it is desirable that more material be distributed from zones of the wall 233 nearer the bottom wall 232. It is to be understood, however, that an inverse progression of orifice size from top to bottom in the cup wall may be utilized if desired, that is the smallest diameter orifices may be adjacent the bottom wall 232 with the larger openings above this region.

The rows of orifices or openings of various sizes may be disposed in any desired relation depending upon the viscosity or other characteristics of the material distributed by the member 230 and the structural characteristics of the rotor with which the distributing member may be used. Furthermore any number of orifices within the structural limitations of the wall 233 may be utilized, the orifices shown in FIGURES 6 and 7 being being merely illustrative of the difference in sizes of the openings of the several rows.

FIGURES 8 and 9 illustrate another form of material distributing member which may be used with the rotor constructions. In this form, the material distributing means or member 215 is formed of two frusto-conically shaped portions 216 and 217 which meet or are joined at their zones of greatest diameter. The member 215 is formed with a bottom wall 219 and the upper frusto-conically shaped section 217 is integrally formed with an inwardly extending flange 220 which provides an open zone 222 to admit glass or other molten material into the interior region defined by the frusto-conically shaped sections 216 and 217.

Each of the sections 216 and 217 is provided with rows of orifices or outlets 224 through which material contained within the member 215 is distributed outwardly under the influence of centrifugal forces of rotation. The bottom wall 219 of member 215 is formed with a threaded tenon 225 for attachment to a rotor construction.

As shown in FIGURE 8, the orifices 224 are illustrated with their axes angularly arranged with respect to the axis of rotation of the member 215, but it is to be understood that the orifices or outlets 224 may be disposed with their axes parallel to the bottom wall 219 viz with their axes arranged normal to the axis of rotation. The number, size and shape of the outlets 224 may be varied dependent upon the amount of material to be distributed by the member toward a peripheral wall zone of a rotor with which the member may be associated.

It is apparent that, within the scope of the invention, modifications and different arrangements may be made other than is herein disclosed, and the present disclosure is illustrative merely, the invention comprehending all variations thereof.

We claim:

1. Apparatus for processing heat-softenable material including, in combination, a rotatable hollow rotor adapted to contain heat-softened material, said rotor having a peripheral wall provided with openings, means for rotating the rotor at a speed whereby centrifugal forces project the material through the openings, a material distributing member of generally cup-like configuration of a diameter substantially less than that of the rotor disposed in the rotor to receive a stream of material, the peripheral wall of said member being formed with a plurality of vertically arranged slots through which material is projected by centrifugal forces to the peripheral wall of the rotor, said member having a flange joining the upper extremities of the wall portions defining the slots, the slots having zones of different widths for controlling the distribution of the material projected through the slots.

2. Apparatus for processing heat-softenable material including, in combination, a rotatable hollow rotor adapted to receive heat-softened material interiorly thereof, said rotor having a peripheral wall provided with openings, means for rotating the rotor at a speed whereby centrifugal forces project the material through the openings, a material distributing member having a bottom wall and a comparatively thin circular vertical wall, said vertical wall being formed with a plurality of outlets, the outlets in certain areas of the vertical wall being restricted for controlling the distribution of material projected through the outlets by centrifugal forces.

3. A rotatable distributing means for heat-softened material comprising a member of cup-like configuration having a bottom wall and an upwardly extending comparatively thin peripheral wall, said peripheral wall being formed with circumferentially spaced slots through which material is projected by centrifugal forces of rotation, said slots having zones of different cross sectional area for controlling the distribution of the material.

References Cited in the file of this patent

UNITED STATES PATENTS

| | | |
|---|---|---|
| 2,192,944 | Thomas | Mar. 12, 1940 |
| 2,318,821 | Wallrath et al. | May 11, 1943 |
| 2,431,205 | Slayter | Nov. 18, 1947 |
| 2,609,566 | Slayter et al. | Sept. 9, 1952 |
| 2,612,654 | O'Conner | Oct. 7, 1952 |
| 2,624,912 | Heymes et al. | Jan. 13, 1953 |
| 2,816,826 | Brennan | Dec. 17, 1957 |

FOREIGN PATENTS

| | | |
|---|---|---|
| 545,633 | Belgium | Feb. 28, 1956 |
| 1,124,488 | France | July 2, 1956 |